(12) United States Patent
Berger et al.

(10) Patent No.: US 9,459,806 B2
(45) Date of Patent: *Oct. 4, 2016

(54) COMBINING VIRTUAL MAPPING METADATA AND PHYSICAL SPACE MAPPING METADATA

(71) Applicant: INTERNATIONAL BUSINESS MACHINES CORPORATION, Armonk, NY (US)

(72) Inventors: Yuval Berger, Tel Aviv (IL); Ben Sasson, Yaffo (IL); Ori Shalev, Kiryat Ono (IL); Yosef Shatsky, Karnei Shomron (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/141,014

(22) Filed: Apr. 28, 2016

(65) Prior Publication Data

US 2016/0239234 A1    Aug. 18, 2016

Related U.S. Application Data

(63) Continuation of application No. 14/177,680, filed on Feb. 11, 2014, now Pat. No. 9,329,780.

(51) Int. Cl.
*G06F 12/10* (2016.01)
*G06F 3/06* (2006.01)

(52) U.S. Cl.
CPC ............ *G06F 3/0626* (2013.01); *G06F 3/061* (2013.01); *G06F 3/067* (2013.01); *G06F 3/0647* (2013.01); *G06F 3/0683* (2013.01)

(58) Field of Classification Search
CPC ........................................................ G06F 3/06
See application file for complete search history.

(56) References Cited

U.S. PATENT DOCUMENTS

| | | | |
|---|---|---|---|
| 7,836,107 B2 | 11/2010 | Gandhi et al. | |
| 7,949,693 B1 | 5/2011 | Mason et al. | |
| 8,185,498 B2 | 5/2012 | Anglin | |
| 2002/0194209 A1* | 12/2002 | Bolosky | G06F 17/30097 |
| 2008/0155602 A1* | 6/2008 | Collet | H04N 21/235 725/46 |
| 2010/0077161 A1* | 3/2010 | Stoakes | G06F 17/30997 711/162 |
| 2011/0302181 A1 | 12/2011 | Amit et al. | |
| 2012/0131025 A1 | 5/2012 | Cheung et al. | |

* cited by examiner

*Primary Examiner* — Adam M Queler
*Assistant Examiner* — Kenneth Tsang
(74) *Attorney, Agent, or Firm* — Griffiths & Seaton PLLC (57) ABSTRACT

For combining virtual mapping metadata and physical space mapping metadata in a storage system by a processor device in a computing environment, data and metadata are maintained into separate virtual streams. The separate virtual streams include a metadata stream for the metadata and a data stream for the data. Metadata for each input/output (I/O) operation received is determined using a linear function operation, the function operation being an offset of the metadata in the metadata stream that is equal to the I/O operation multiplied by a maximal metadata ratio. The metadata is allocated on the metadata stream and the metadata stream is divided into fixed size block that is responsible for describing a size of a logical space, where the logical space is equal to one divided by the maximal metadata ratio, and it is determined if the metadata has been previously loaded.

19 Claims, 8 Drawing Sheets

COMBINING VIRTUAL MAPPING METADATA AND PHYSICAL SPACE MAPPING METADATA

CROSS REFERENCE TO RELATED APPLICATIONS

This Application is a Continuation of U.S. patent application Ser. No. 14/177,680, filed on Feb. 11, 2014.

BACKGROUND OF THE INVENTION

1. Field of the Invention

The present invention relates in general to computers, and more particularly to combining virtual mapping metadata and physical space mapping metadata in a storage system in a computing environment.

2. Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components. As such, a need exists for increasing the efficiency of storing and maintaining data and metadata in a computing storage system.

SUMMARY OF THE DESCRIBED EMBODIMENTS

In one embodiment, a method is provided for combining virtual mapping metadata and physical space mapping metadata in a storage system in a computing environment. In one embodiment, by way of example only, data and metadata are maintained into separate virtual streams. The separate virtual streams include a metadata stream for the metadata and a data stream for the data. Metadata for each input/output (I/O) operation received is determined using a linear function operation, the function operation being an offset of the metadata in the metadata stream that is equal to the I/O operation multiplied by a maximal metadata ratio. The metadata is allocated on the metadata stream and the metadata stream is divided into fixed size block that is responsible for describing a size of a logical space, where the logical space is equal to one divided by the maximal metadata ratio, and it is determined if the metadata has been previously loaded.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, due to the expenses and resources required for data storage, it is desirable to minimize the amount of storage required to store structured data. Thus, in one embodiment, the computing system may utilize block storage by partitioning disk space into volumes. A volume has continuous address space and is accessible to user input/output (I/O). In one embodiment, two methods may be employed for arranging volume data on physical disks: Thick Provisioning and Thin Provisioning. In thick provisioning, a user writes directly to a physical address and therefore no metadata is required and no address translation is necessary. In thin provisioning, the user writes to virtual addresses that are translated in to physical disk address by the storage system. Thin provisioning requires the storage system to maintain metadata that contains the virtual address mapping. The key advantage of thin provisioning is that it provides the ability to allocate more space to volumes than actually physically exists on storage. This is obtained by dynamically allocating physical space to a volume on demand, and mapping the allocated block to the virtual address space. However, these advantages come at an expense. Additional resources are required to maintain the mapping metadata, and performance is compromised due to the virtual address translation. Thin provisioning uses large constant size blocks in order to keep the number of blocks low, thereby allowing the look-up table to be small enough to maintain in memory.

In one embodiment, real time compression may be employed for storing data in a storage system. For real time compression, data is compressed on the fly, to and from the storage system, in a manner transparent to the user. A compressed volume is similar to a thin provisioned volume in the sense that a mechanism is required to translate a user address in to the location of the data on disk. However, the requirements for compression are much more complex, as described in the following paragraphs.

In one embodiment, size and placement may be considered for data storage. In one embodiment, for compressed volumes, it is unknown in advance how much space the data and metadata will occupy on disk. The amounts also vary from block to block. Furthermore, unlike thin provisioning, compression requires mapping the data within blocks. This dramatically increases the amount of necessary metadata, and makes address translation more complex. Not knowing in advance how much space the metadata will occupy, makes it difficult to pre-reserve disk space for metadata.

In one embodiment, access may be considered for data storage. For all but the smallest storage platforms, the amount of metadata will be too large to hold in memory. The metadata will need to constantly be swapped in and out of memory. In one embodiment, the present invention may be to maintain hierarchal metadata. The first level of metadata describes the location of the second level of metadata, and the second level describes the location of the data. In such a model, a single user I/O can lead to 2 metadata I/Os and a data I/O. This amount of I/Os required to server one user-I/O can severely degrade performance to an unacceptable level.

In one embodiment, free space management may be considered for data storage. Thin provisioning manages some information about the content of a block in order to determine when the block can be freed. When the data is compressed, every write operation must undergo an allocation process finding appropriate location to place the data. The allocation process will introduce fragmentation issues that don't exist in thin provisioning.

Thus, the present invention addresses the challenges to data storage in a computing storage environment by combining virtual mapping metadata and physical space mapping metadata in a storage system in a computing environment. In one embodiment, by way of example only, data and metadata are maintained into separate virtual streams. The separate virtual streams include a metadata stream for the metadata and a data stream for the data. Mapping information of the logical data to a location on the data stream and a current state of unused spaces in the data stream is linearly distributed within the metadata stream.

In one embodiment, the present invention maintains data and metadata in two separate virtual "streams" of large size grains (physical block/unit size that is handled by the storage platform). The metadata stream includes two unrelated types of information: (i) mapping of logical data to its location on the data stream, and (ii) current state of unused spaces in the data stream. Thus, one of the major novelties of the present invention is the fact that both types of information stored in the metadata stream are distributed linearly within the metadata stream. The system deduces (by some linear function) the location of metadata required for acting on specific regions of logical data and specific regions of unused space in the physical stream. Thus, as described herein, the present invention assists in reducing the overhead I/O usually required for metadata access, thereby making the storage system more efficient. Also, the present invention makes the indirectly mapped data system sustainable by automatically striving to store related logical data in adjacent locations. By slightly "mixing" the physical and virtual layers, the system remains balanced and robust over time.

In contrast, and to address the inefficiencies and performance issues previously described, the illustrated embodiments provide mechanisms for detecting tabular data and executing column compression algorithms to enable higher compression ratio. The mechanisms, for example, estimate a data structure for an initially unknown structured data in a storage controller. The estimated data structure may be placed in a stream. A columnar compression operation may be applied to the stream to generate an achieved compression ratio. The stream may be compressed. Feedback of the achieved compression ratio may be analyzed from the stream to determine if an optimal one of the columnar compression operations has been applied. If the optimal one of the columnar compression operations has been applied, the actual data structure of the initially unknown structured data may be determined.

In one embodiment, the present invention arranges, in a data storage system, a metadata stream in a fixed logical relationship with data, and stores metadata having data mapping in fixed spaces together with physical unused space mapping. The present invention strives to localize logical data on a physical medium and this is the outcome of the free space mechanism introduced, and provides for real time random access to compress data.

It should be noted that as used herein, "streams" refer to metadata and data that are split into two streams, "access" refers to random access as compared to sequential access within a stream, metadata size is up to ten per-cent (10%) of the data, free space size grain is relatively small as compared to the large grain being used in thin provisioning, and input/output (I/O) size is also relatively small and measured in kilobytes (KB) as compared to very large such as a full stream (e.g., to read the last block of a stream it is required to first read all the preceding blocks in the stream), and access complexity may be complex due to compression and offsets must be calculated within blocks as compared to simple access, such as within a block offsets are the same in user space and physical space. Moreover, it should be noted that as used herein, that file format refers to dual streams over large grain abstraction layer (thin provisioning) as compared to a single stream divided into sub files. I/O per access refers to at most one I/O that is required for a metadata read as compared to a worst case where all metadata sub-files must be read (e.g., many I/Os), and shrink file refers to moving data from end of file to free space as compared to merely shifting. Space allocation refers to striving to localize virtual address on the physical medium as compared to an unspecified-end of file. Also, it should be noted that present invention targets large scale-volume based storage systems, and the present invention focuses on server side performance (e.g., a number of required I/Os)

Figure 1:
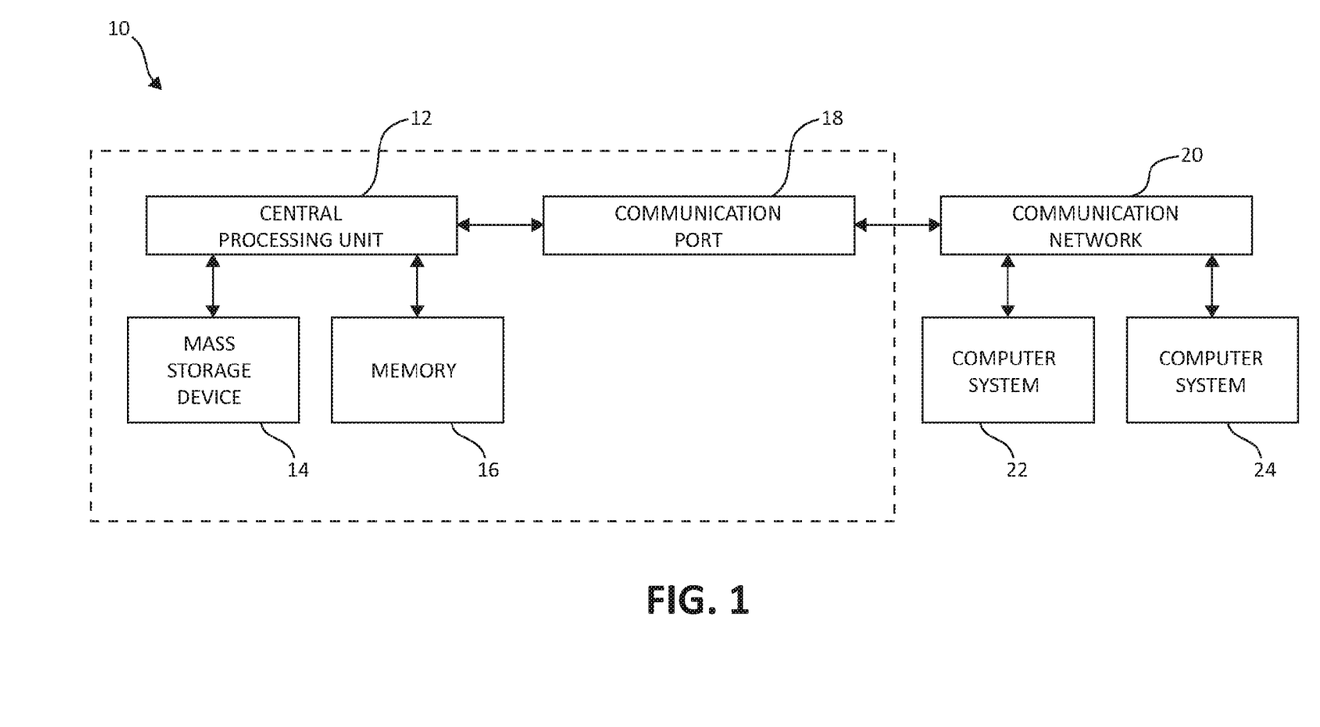
FIG. 1 illustrates a computer storage environment having an example storage device in which aspects of the present invention may be realized.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
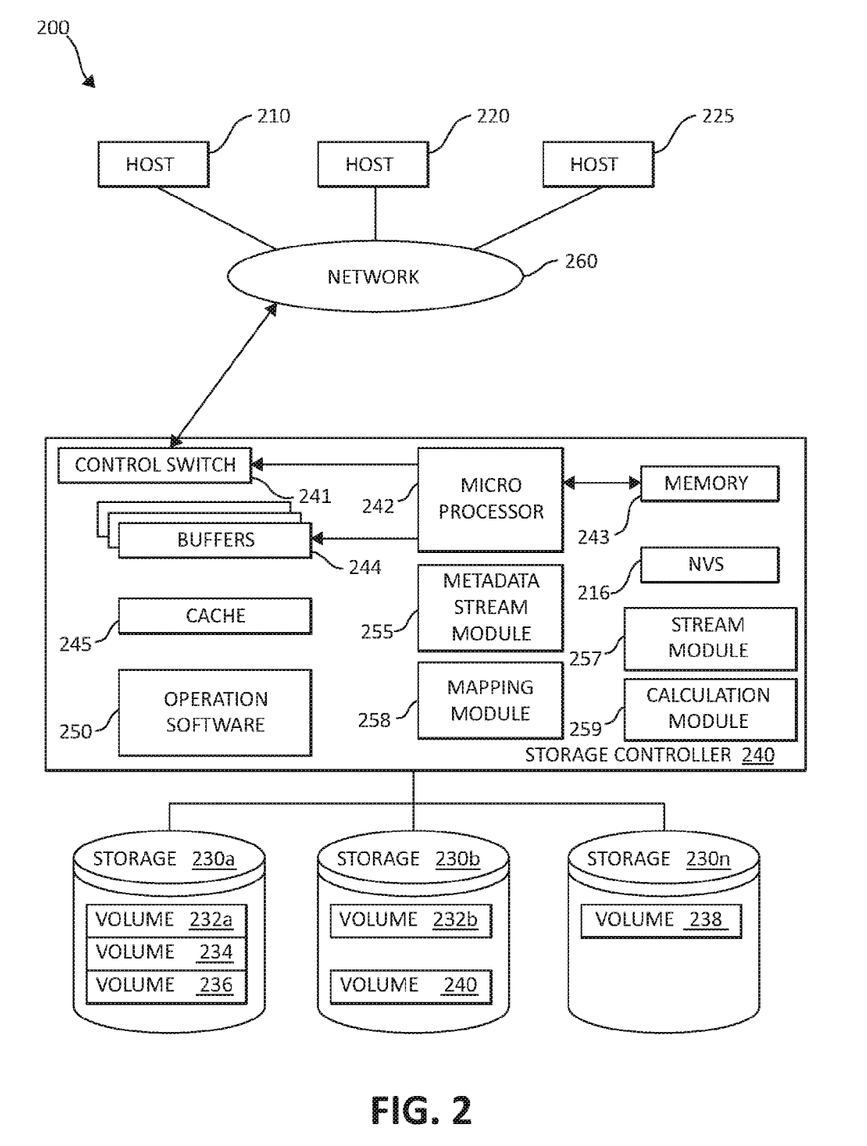
FIG. 2 illustrates an exemplary block diagram showing a hardware structure of a data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230. In one embodiment, the embodiments described herein may be applicable to a variety of types of computing architectures, such as in a virtual cluster management environment using the various embodiments as described herein.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores the operation software 250, program instructions and data, which the processor 242 may access for executing functions and method steps associated with managing storage 230, and executing the steps and methods of the present invention. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a metadata stream module 255, a data stream module 257, a mapping module 258, and a calculation module 259. The metadata stream module 255, the data stream module 257, the mapping module 258, and the calculation module 259 may be one complete module functioning simultaneously or separate modules. The metadata stream module 255, the data stream module 257, the mapping module 258, and the calculation module 259 may have some internal memory (not shown) and may store unprocessed, processed, or "semi-processed" data. The metadata stream module 255, the data stream module 257, the mapping module 258, and the calculation module 259 may work in conjunction with each and every component of the storage controller 240, the hosts 210, 220, 225, and other storage controllers 240 and hosts 210, 220, and 225 that may be remotely connected via the storage fabric 260. Both the metadata stream module 255, the data stream module 257, the mapping module 258, and the calculation module 259 may be structurally one complete module or may be associated and/or included with other individual modules. The metadata stream module 255, the data stream module 257, the mapping module 258, and the calculation module 259 may also be located in the cache 245 or other components of the storage controller 240.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, a control switch 241 for controlling a protocol to control data transfer to or from the metadata stream module 255, the data stream module 257, the mapping module 258, and the calculation module 259 in which information may be set. Multiple buffers 244 may be implemented to assist with the methods and steps as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." The microprocessor 242 may control the memory 243 to store command information from the cluster host/node device (physical or virtual) 210 and information for identifying the cluster host/node device (physical or virtual) 210. The control switch 241, the buffers 244, the cache 245, the operating software 250, the microprocessor 242, memory 243, NVS 216, the metadata stream module 255, the data stream module 257, the mapping module 258, and the calculation module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

Figure 3:
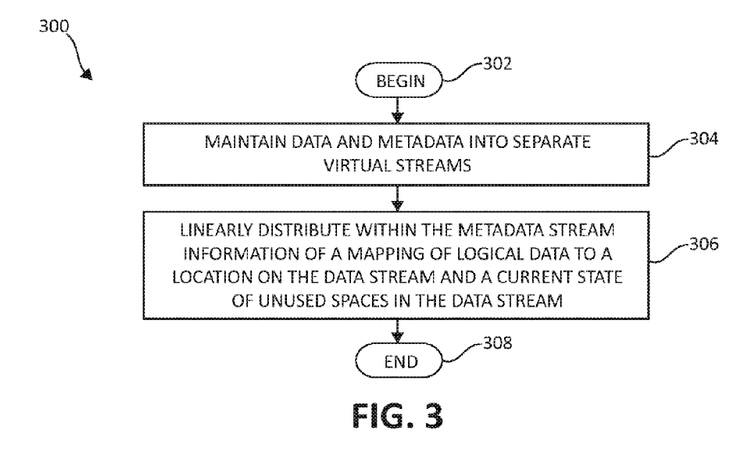
FIG. 3 is a flowchart illustrating an exemplary method for combining virtual mapping metadata and physical space mapping metadata in a storage system in which aspects of the present invention may be realized.

FIG. 3 is a flowchart illustrating an exemplary method 300 for combining virtual mapping metadata and physical space mapping metadata in a storage system in which aspects of the present invention may be realized. The method 300 begins (step 302). The method 300 maintains data and metadata into separate virtual streams (step 304). The method 300 linearly distributes within the metadata stream information of a mapping of logical data to a location on the data stream and a current state of unused spaces in the data stream (step 306). The method 300 ends (step 308).

Figure 4:
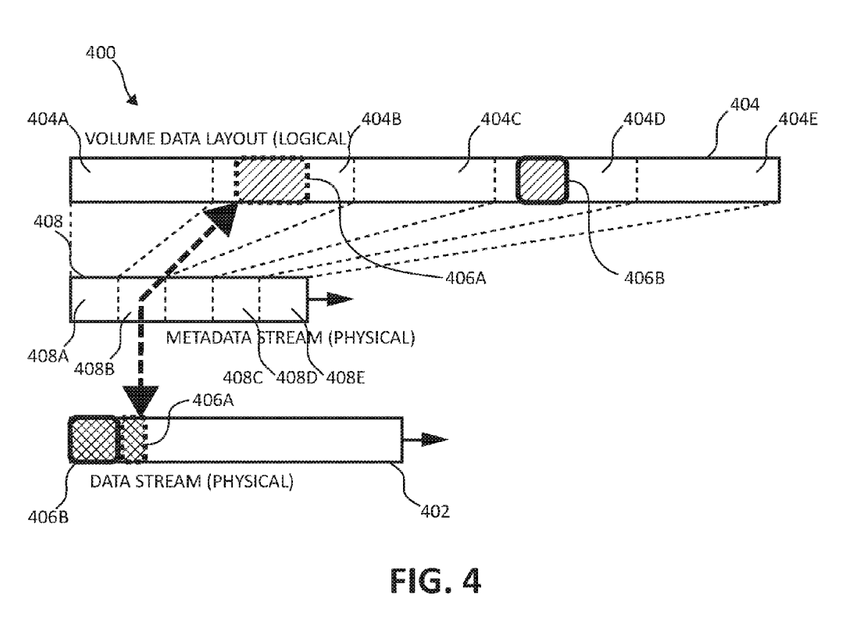
FIG. 4 is a block diagram illustrating an exemplary structure of non-adjacent data pieces mapped to adjacent location on a physical device in which aspects of the present invention may be realized.
Figure 5:
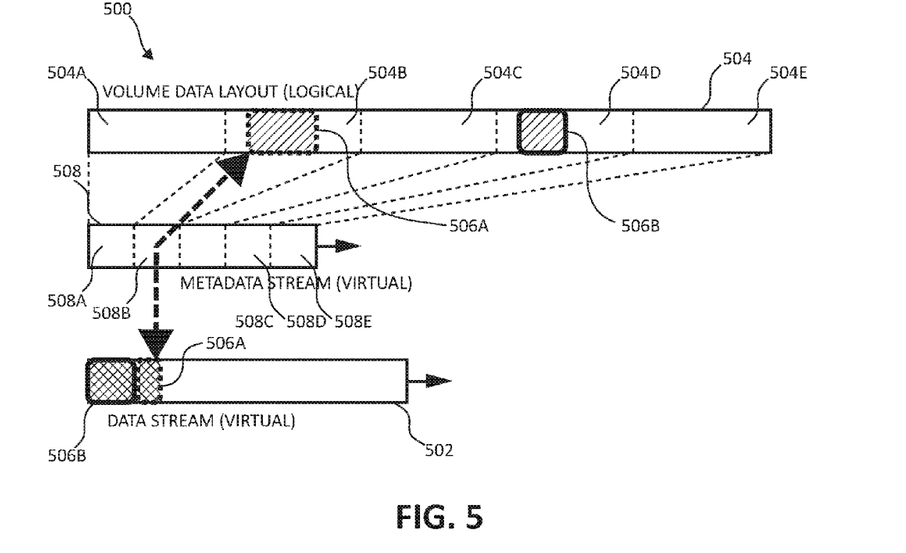
FIG. 5 is a block diagram illustrating an exemplary structure of data and metadata being accessed through an additional abstraction layer in which aspects of the present invention may be realized.

FIG. 4 is a block diagram illustrating an exemplary structure 400 of non-adjacent data pieces mapped to adjacent location on a physical device in which aspects of the present invention may be realized. Non-adjacent data pieces are mapped to an adjacent location on the physical device. FIG. 4 illustrates two non-adjacent data pieces 406A and 406B, illustrated and shown in the volume data layout (logical) 404, are mapped to adjacent locations 406B and 406A on a physical device 402. The volume data layout (logical) 404 (shown with data pieces 404A-E) contains the two non-adjacent data pieces 406A and 406B, for illustration purposes. This mapping is kept persistent on the physical devices 402 in the form of a "metadata stream" 408 (shown with each piece 408 broken into data pieces 408A-E). Both data stream 402 and metadata stream 408 reside on the physical device 402 in some form. In one implementation, those streams 402 and 408 are indirectly mapped to the physical device 402 using an additional virtualization layer operating on much larger grains. FIG. 5, below, emphasizes the distinctive terms of logical, virtual, and physical.

FIG. 5 is a block diagram illustrating an exemplary structure 500 of data and metadata being accessed through an additional abstraction layer in which aspects of the present invention may be realized. FIG. 5 shows data and metadata are now accessed through an additional abstraction layer, hence "virtual". FIG. 5 illustrates two non-adjacent data pieces 506A and 506B, illustrated and shown in the volume data layout (logical) 504, are mapped to adjacent locations 506B and 506A on a virtual device 502. The volume data layout (logical) 504 (shown with data pieces 504A-E) contains the two non-adjacent data pieces 506A and 506B, for illustration purposes. This mapping is kept persistent on the virtual devices 502 in the form of a "metadata stream" 508 (shown with each piece 508 broken into data pieces 508A-E). Both data stream 502 (virtual) and metadata stream 508 (virtual) reside on the virtual device 502 in some form. In one implementation, those streams 502 and 508 are indirectly mapped to the physical device 402 using an additional virtualization layer operating on much larger grains.

Figure 6:
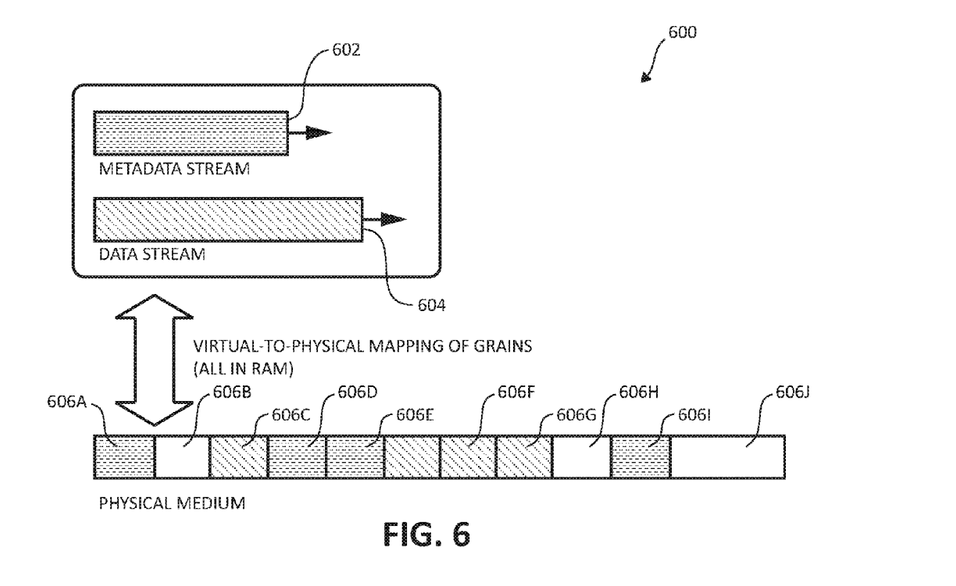
FIG. 6 is a block diagram illustrating an exemplary structure of fixed-grained virtual-to-physical mapping of multiple stream into a single physical medium in which aspects of the present invention may be realized.

FIG. 6 is a block diagram illustrating an exemplary structure 600 of fixed-grained virtual-to-physical mapping of multiple stream into a single physical medium in which aspects of the present invention may be realized. FIG. 6 illustrates a fixed-grained virtual-to-physical mapping of multiple stream 602 and 604 into a single physical medium 606 (shown with 606A-J). In FIG. 6, "grains" of data and metadata 606A-J are mapped to the physical medium 606.

For illustration purposes and by way of example only, from this point, the present invention will refer to the data and metadata streams as operating on the virtual layer. The logical (user view) of the volume could also be regarded as "virtual" (as in some applications, for example when compression/de-duplication are applied, the actual data that will reside on the physical medium may be different, de-duped/compressed for example).

Low IO Overhead.

Figure 7:
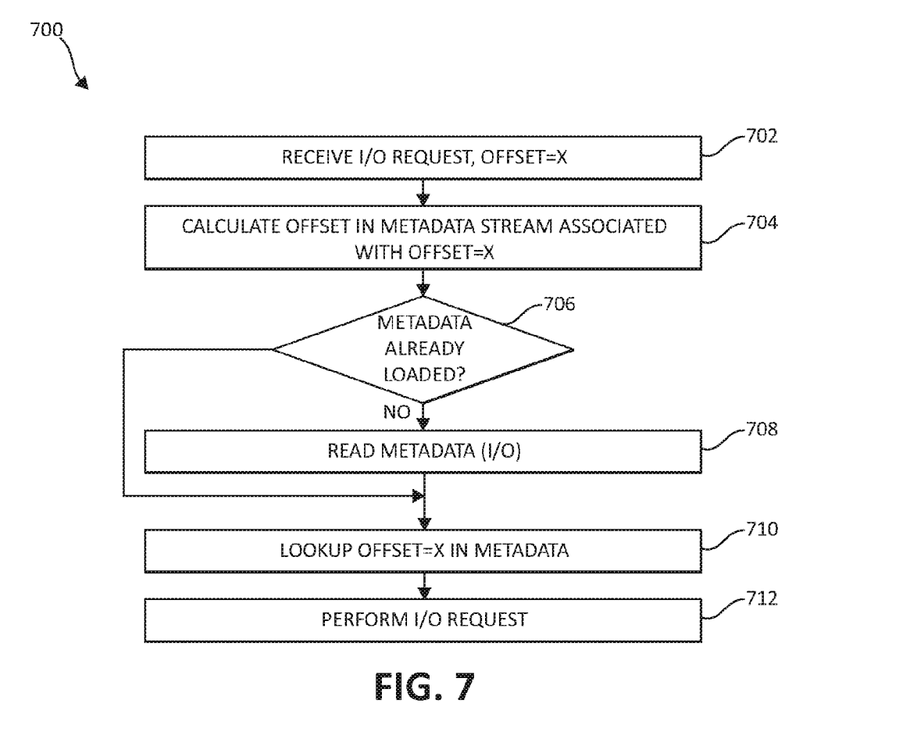
FIG. 7 is a flowchart illustrating an exemplary method for accessing an arbitrary piece of data in which aspects of the present invention may be realized.

One of the strengths of the described solution is that the present invention allows relatively low-overhead access to any piece of data, while maintaining the benefits of thin-provisioning. Accessing an arbitrary piece of data is done according to the following flowchart illustrated in FIG. 7. FIG. 7 is a flowchart illustrating an exemplary method 700 for accessing an arbitrary piece of data in which aspects of the present invention may be realized. The method 700 receives an input/output (I/O) request (offset equals "X") (step 702). The method 700 calculates the offset in the metadata stream associated with the logical offset "X" (logical offset, is an address in "volume data layout" see FIG. 5), this is done in step 704. The method 700 determines if the metadata is already loaded (step 706). If no, the method 700 reads the metadata (I/O operation) from the disk (step 708). If yes, (and also from step 708), the method 700 looks up the offset that equals logical offset "X" in the metadata (step 710). The method 700 performs the I/O request (step 712).

In one embodiment, when an I/O request is received, the related metadata piece of the I/O request should be determined. This is done using a linear function which states the following: the offset of metadata in metadata stream is equal to the Input/output logical offset multiplied by the maximal metadata ratio, or in other words, [offset of metadata in metadata stream]=[IO logical offset]*[Maximal metadata ratio].

The maximal metadata ratio is a constant, such as 0.1, meaning the system allocates 10 times less space for metadata than the logical volume space. This space is allocated on the metadata stream. Metadata stream is divided into fixed size blocks; each is responsible for describing logical space=[metadata block size]*1/[Maximal metadata ratio] of its size. For example, each metadata block of 1 MB will describe a logical region of 10 MB, linearly.

It should be noted that while serving I/O patterns, metadata is likely to be already loaded hence only a single I/O is required. In one embodiment, two I/O's are required at most regardless of the I/O pattern. This property is achieved due to the linear function used to determine the location of the metadata related to the I/O in question and the temporal locality nature of I/O in real life.

In one embodiment, the [Maximal metadata ratio] is conservatively set to ensure all of the region's metadata could fit in, and because of that, many metadata blocks are far from being utilized by metadata (metadata usage is I/O pattern dependent and is implementation specific). This has a negative impact on compression ratio, which can be eliminated by using some of the remaining space on metadata block to store data.

Unused Space Maintenance

Figure 8:
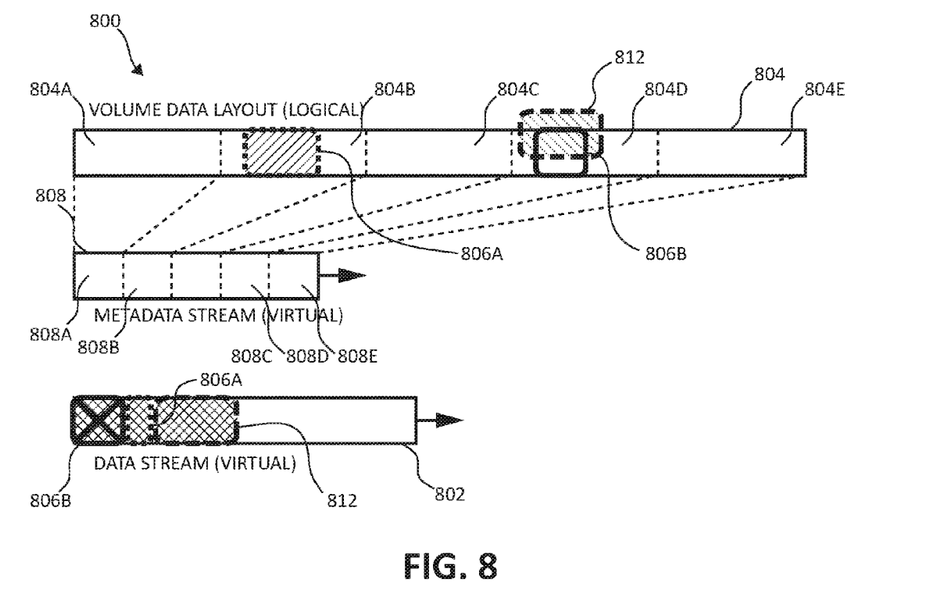
FIG. 8 is a block diagram illustrating an exemplary structure of management of unused space when a piece of logical data gets overridden by a new one with some space being invalidated and ultimately reclaimed to maintain space utilization in which aspects of the present invention may be realized.

One of the challenges when designing a storage system with indirect mapping is the management of unused space. When a piece of logical data is overridden by a new one, some space should be invalidated and ultimately reclaimed to maintain space utilization. Depending mainly on I/O patterns, segments of invalidated space are spread all over the physical domain, negatively contributing to space efficiency, increasing data fragmentation. FIG. 8 is a block diagram illustrating an exemplary structure of management of unused space when a piece of logical data gets overridden by a new one with some space being invalidated and ultimately reclaimed to maintain space utilization in which aspects of the present invention may be realized. FIG. 8 illustrates two non-adjacent data pieces 806A and 806B, illustrated and shown in the volume data layout (logical) 804, are mapped to adjacent locations 806B and 806A on a virtual device 802. The volume data layout (logical) 804 (shown with data pieces 804A-E) contains the two non-adjacent data pieces 806A and 806B, for illustration purposes. This mapping is kept persistent on the virtual devices 802 in the form of a "metadata stream" 808 (shown with each piece 808 broken into data pieces 808A-E). Both data stream 802 (virtual) and metadata stream 808 (virtual) reside on the virtual device 802 in some form. In one implementation, those streams 802 and 808 are indirectly mapped to the physical device using an additional virtualization layer operating on much larger grains. However, as illustrated by way of example only, a piece of logical data 804D is overridden by a new piece of logical data 812 with some space being invalidated and ultimately reclaimed to maintain space utilization, as shown by data 806B in the data stream (virtual) 802 becoming unused.

In one embodiment, the present invention presents a novel approach for storing the unused-space related metadata. Similarly to the way logical mapping metadata is linearly spread on the metadata stream, the present invention organizes unused space related metadata linearly by the virtual domain, as opposed to the logical mapping metadata, which is linearly mapped to the logical domain.

Figure 9:
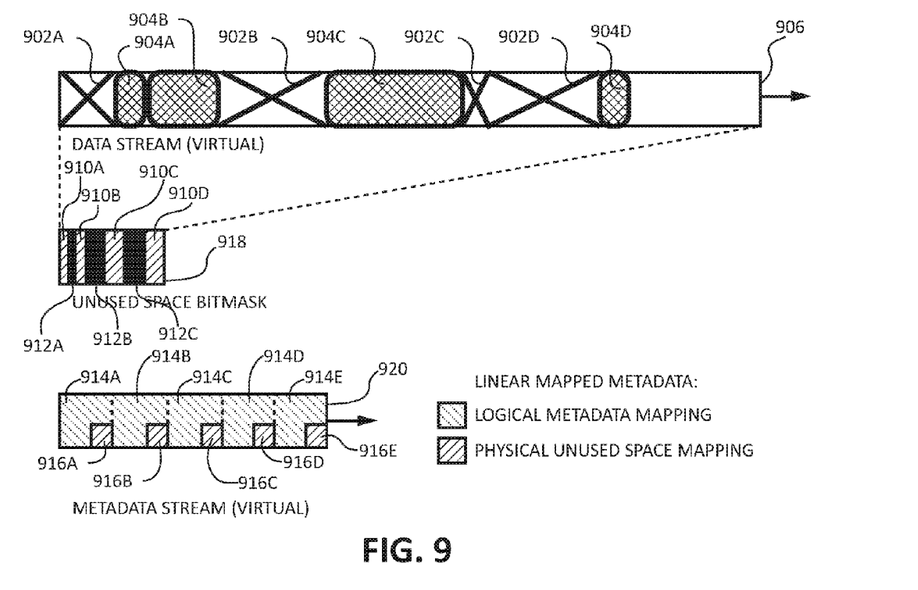
FIG. 9 is a block diagram illustrating an exemplary structure of abstract unused space bit-mask that maps the unused parts of the data stream ("virtual domain") in which aspects of the present invention may be realized.

FIG. 9 is a block diagram illustrating an exemplary structure of abstract unused space bit-mask that maps the unused parts of the data stream ("virtual domain") in which aspects of the present invention may be realized. FIG. 9 illustrates linear mapped metadata. FIG. 9 illustrates linear metadata mapping 914 (shown as 914A-E) and physical unused space mapping 916 (shown as 916A-E) on the metadata stream (virtual) 920. The bit-mask 918 (shown with unused parts 910A-D and used parts 912A-C) can be stored linearly to the data stream 906 (shown with unused parts 902A-D and used parts 904A-D) inside the metadata stream 920, together with other (probably unrelated) metadata. When space in the data stream 906 is needed for new writes, this distributed bit-mask 910 is used to find a suitable unused data stream piece 902 (e.g., unused parts 902A-D). Note that this bit-mask 918 need not be entirely loaded into memory, as long as large enough portion of it is cache in memory, there should be no overhead I/O when looking for new space. Residing next to other metadata pieces contributes to the low I/O overhead, and automatically strives to store logically related data in adjacent locations in the data stream.

Figure 10:
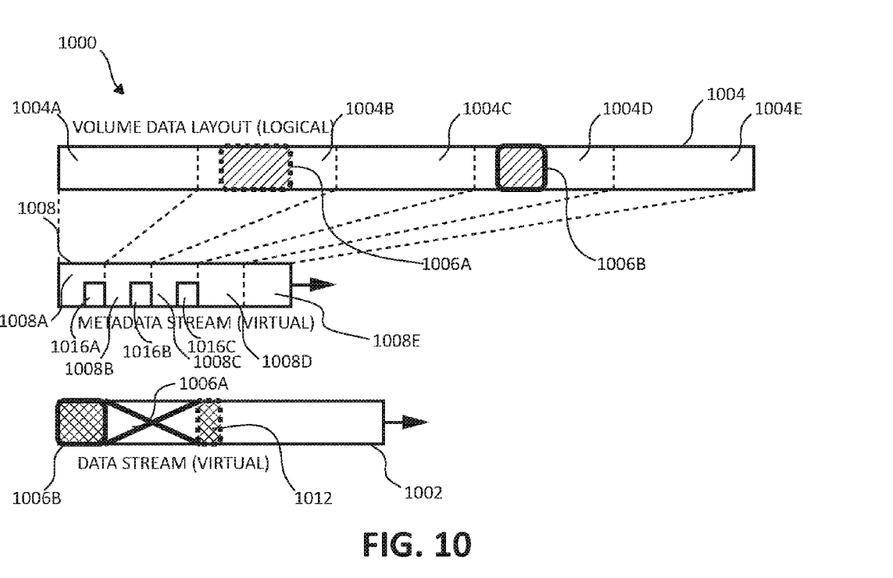
FIG. 10 is a block diagram illustrating an exemplary structure of unused space mapping not filling up all the logical-to-virtual mapping metadata stream due to different targets of the two linear mappings in which aspects of the present invention may be realized.

FIG. 10 is a block diagram illustrating an exemplary structure 1000 of unused space mapping not filling up the entire logical-to-virtual mapping metadata stream due to different targets of the two linear mappings in which aspects of the present invention may be realized. FIG. 10 illustrates two non-adjacent data pieces 1006A and 1006B, illustrated and shown in the volume data layout (logical) 1004, are mapped to adjacent locations 1006B and 1006A on a virtual device 1002. The volume data layout (logical) 1004 (shown with data pieces 1004A-E) contains the two non-adjacent data pieces 1006A and 1006B, for illustration purposes. This mapping is kept persistent on the virtual devices 1002 in the form of a "metadata stream" 1008 (shown with each piece 1008 broken into data pieces 1008A-E). Both data stream 1002 (virtual) and metadata stream 1008 (virtual) reside on the virtual device 1002 in some form. FIG. 10 illustrates linear metadata mapping 1008 (shown as 1008A-E) and physical unused space mapping 1016 (shown as 1016A-C) on the metadata stream (virtual) 1008. In FIG. 10, it is observed that due to the different targets of the two linear mappings 1004 and 1008, the unused space mapping 1016A may not fill up all the logical-to-virtual mapping metadata stream 1006B and 1012, for example.

Figure 11:
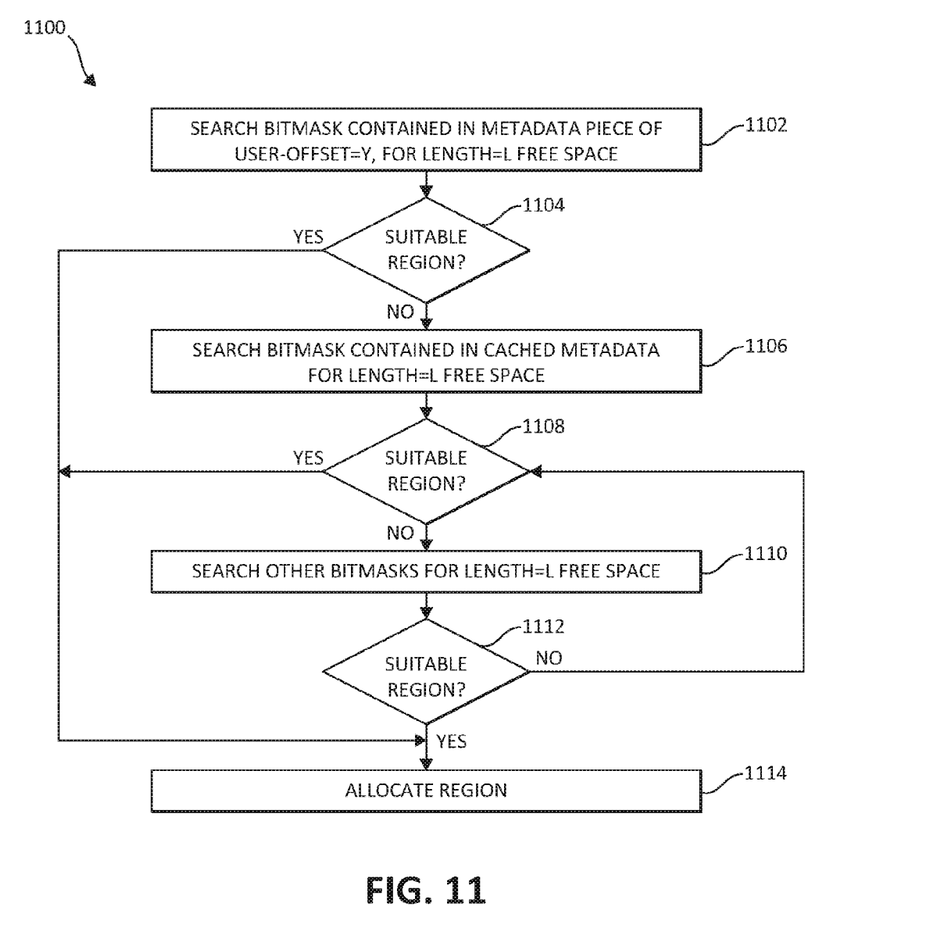
FIG. 11 is a flowchart illustrating an exemplary method for accessing an unused space bitmap in which aspects of the present invention may be realized.

FIG. 11 is a flowchart illustrating an exemplary method 1100 for accessing an unused space bitmap in which aspects of the present invention may be realized. The method 1100 searches a bit-mask contained in a metadata piece of user-offset (that equals "Y") for a length (that equals "L") of free space (step 1102). The method 1100 determines if there is a suitable region (step 1104). If yes, the method 1100 allocates a region of the suitable regions (step 1114). If no, the method 1100 searches the bit-mask contained in cached metadata for Length (e.g., Length=L) of free space (step 1106). Once again, the method 1100 determines if there is a suitable region (step 1108). If yes, the method 1100 allocates a region of the suitable regions (step 1114). If no, the method 1100 searches other bit-masks for Length (e.g., Length=L) of free space (step 1110). Once again, the method 1100 determines if there is a suitable region (step 1112). If yes, the method 1100 allocates a region of the suitable regions (step 1114). If no, the method 1100 returns to step 1108.

In one embodiment, by way of example only, FIG. 11 illustrates the principles of accessing the unused space bitmap. When possible, the present invention allocates space from the physical target of the currently active metadata block. If no suitable unused region is found, the present invention searches a cached part of the bit-mask, and only if nothing is found, the present invention must perform I/O operations to load other parts of the bit-mask. Additional on-memory data structures may be heuristically used to minimize the amount of I/Os performed in this process.

In one embodiment, by way of example only, for combining virtual mapping metadata and physical space mapping metadata in a storage system by a processor device in a computing environment, the present invention maintains data and metadata into separate virtual streams. The separate virtual streams include a metadata stream for the metadata and a data stream for the data. The present invention linearly distributes within the metadata stream information of a mapping of logical data to a location on the data stream and a current state of unused spaces in the data stream.

In one embodiment, by way of example only, the present invention arranges the metadata stream in a fixed logical relationship with the data and storing the metadata having data mapping in fixed spaces together with physical unused space mapping.

In one embodiment, by way of example only, the present invention deduces by a linear function a location of metadata related to an input/output (I/O) operation required for acting on regions of logical data and regions of unused spaces in the data stream. In one embodiment, by way of example only, the present invention stores unused-space metadata by linearly organizing the unused-space metadata over the data stream, and maps the unused-space of the data stream using a bit-mask that is linearly stored to the data stream inside the metadata stream.

In one embodiment, by way of example only, the present invention determines the metadata for each input/output (I/O) operation received using a linear function operation, wherein the function operation is an offset of the metadata in the metadata stream that is equal to the I/O operation's offset multiplied by a maximal metadata ratio, allocates the metadata on the metadata stream and dividing the metadata stream into fixed size block that is responsible for describing a size of a logical space, wherein the logical space is equal to one divided by the maximal metadata ratio, and/or determines if the metadata has been previously loaded.

In one embodiment, by way of example only, the present invention uses a bit-mask to locate a preferred unused-space of the data stream when space in the data stream is required for a write operation, automatically and/or dynamically stores logically related data in adjacent locations in the data stream, and/or allocates space from a physical target of a currently active metadata block.

In one embodiment, by way of example only, the present invention calculates an offset in the metadata stream associated by multiplying an input/output (I/O) logical offset by a maximal metadata ratio.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium (e.g., non-transitory computer-readable storage medium) or a computer readable storage medium (e.g., a non-transitory computer-readable storage medium). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It will also be noted that each block of the block diagrams and/or flowchart illustration, and combinations of blocks in the block diagrams and/or flowchart illustration, is implemented individually as one individual component or aspect of the present invention and/or implemented in combination with each other thereby forming the present invention as one complete block diagram and/or flowchart illustration.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for combining virtual mapping metadata and physical space mapping metadata in a storage system by a processor device in a computing environment, the method comprising:
   maintaining data and metadata into separate virtual streams, wherein the separate virtual streams include a metadata stream for the metadata and a data stream for the data; and
   determining the metadata for each input/output (I/O) operation received using a linear function operation, wherein the function operation is an offset of the metadata in the metadata stream that is equal to the I/O operation multiplied by a maximal metadata ratio, allocating the metadata on the metadata stream and dividing the metadata stream into fixed size block that is responsible for describing a size of a logical space, wherein the logical space is equal to one divided by the maximal metadata ratio, and determining if the metadata has been previously loaded.

2. The method of claim 1, further including linearly distributing within the metadata stream information of a mapping of logical data to a location on the data stream and a current state of unused spaces in the data stream.

3. The method of claim 2, further including arranging the metadata stream in a fixed logical relationship with the data and storing the metadata having data mapping in fixed spaces together with physical unused space mapping.

4. The method of claim 2, further including deducing by a linear function a location of metadata related to an input/output (I/O) operation required for acting on regions of logical data and regions of unused spaces in the data stream.

5. The method of claim 2, further including storing unused-space metadata by linearly organizing the unused-space metadata of the data stream in the metadata stream.

6. The method of claim 2, further including mapping the unused-space of the data stream using a bit-mask that is linearly stored to the data stream inside the metadata stream.

7. The method of claim 2, further including performing at least one of:
   using a bit-mask to locate a preferred unused-space of the data stream when space in the data stream is required for a write operation,
   automatically storing logically related data in adjacent locations in the data stream, and
   allocating space from a physical target of a currently active metadata block.

8. A system for combining virtual mapping metadata and physical space mapping metadata in a computing storage environment, comprising:
   at least one processor device, operable in the computing storage environment, wherein the at least one processor device:
      maintains data and metadata into separate virtual streams, wherein the separate virtual streams include a metadata stream for the metadata and a data stream for the data; and
      determines the metadata for each input/output (I/O) operation received using a linear function operation, wherein the function operation is an offset of the metadata in the metadata stream that is equal to the I/O operation multiplied by a maximal metadata ratio, allocating the metadata on the metadata stream and dividing the metadata stream into fixed size block that is responsible for describing a size of a logical space, wherein the logical space is equal to one divided by the maximal metadata ratio, and determining if the metadata has been previously loaded.

9. The system of claim 8, wherein the at least one processor device linearly distributes within the metadata stream information of a mapping of logical data to a location on the data stream and a current state of unused spaces in the data stream.

10. The system of claim 9, wherein the at least one processor device arranges the metadata stream in a fixed logical relationship with the data and storing the metadata having data mapping in fixed spaces together with physical unused space mapping.

11. The system of claim 9, wherein the at least one processor device deduces by a linear function a location of metadata related to an input/output (I/O) operation required for acting on regions of logical data and regions of unused spaces in the data stream.

12. The system of claim 9, wherein the at least one processor device stores unused-space metadata by linearly organizing the unused-space metadata over the data stream.

13. The system of claim 9, wherein the at least one processor device maps the unused-space of the data stream using a bit-mask that is linearly stored to the data stream inside the metadata stream.

14. The system of claim 9, wherein the at least one processor device performs at least one of:
using a bit-mask to locate a preferred unused-space of the data stream when space in the data stream is required for a write operation,
automatically storing logically related data in adjacent locations in the data stream, and
allocating space from a physical target of a currently active metadata block.

15. A computer program product for combining virtual mapping metadata and physical space mapping metadata in a storage system by a processor device, the computer program product comprising a non-transitory computer-readable storage medium having computer-readable program code portions stored therein, the computer-readable program code portions comprising:
an executable portion that maintains data and metadata into separate virtual streams, wherein the separate virtual streams include a metadata stream for the metadata and a data stream for the data; and
an executable portion that determines the metadata for each input/output (I/O) operation received using a linear function operation, wherein the function operation is an offset of the metadata in the metadata stream that is equal to the I/O operation multiplied by a maximal metadata ratio, allocating the metadata on the metadata stream and dividing the metadata stream into fixed size block that is responsible for describing a size of a logical space, wherein the logical space is equal to one divided by the maximal metadata ratio, and determining if the metadata has been previously loaded.

16. The computer program product of claim 15, further including an executable portion that linearly distributing within the metadata stream information of a mapping of logical data to a location on the data stream and a current state of unused spaces in the data stream.

17. The computer program product of claim 16, further including an executable portion that arranges the metadata stream in a fixed logical relationship with the data and storing the metadata having data mapping in fixed spaces together with physical unused space mapping.

18. The computer program product of claim 16, further including an executable portion that deduces by a linear function a location of metadata related to an input/output (I/O) operation required for acting on regions of logical data and regions of unused spaces in the data stream.

19. The computer program product of claim 16, further including an executable portion that performs at least one of:
storing unused-space metadata by linearly organizing the unused-space metadata over the data stream,
mapping the unused-space of the data stream using a bit-mask that is linearly stored to the data stream inside the metadata stream,
using a bit-mask to locate a preferred unused-space of the data stream when space in the data stream is required for a write operation,
automatically storing logically related data in adjacent locations in the data stream, and
allocating space from a physical target of a currently active metadata block.

* * * * *